Oct. 6, 1925.  
C. PARKER  
1,556,538  
METHOD OF AND MACHINE FOR MAKING AND ASSEMBLING CHAIN LINKS  
Filed Sept. 17, 1921   4 Sheets-Sheet 2
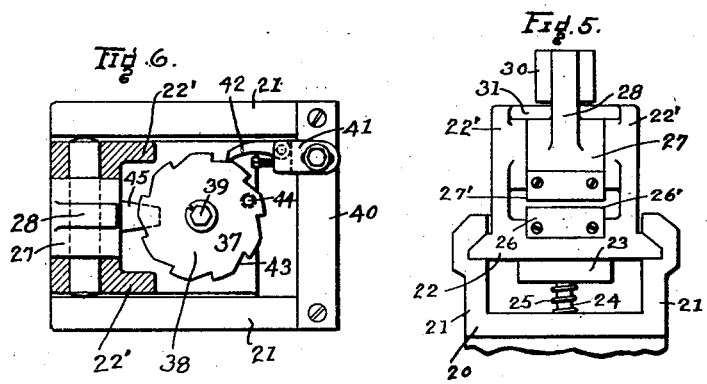
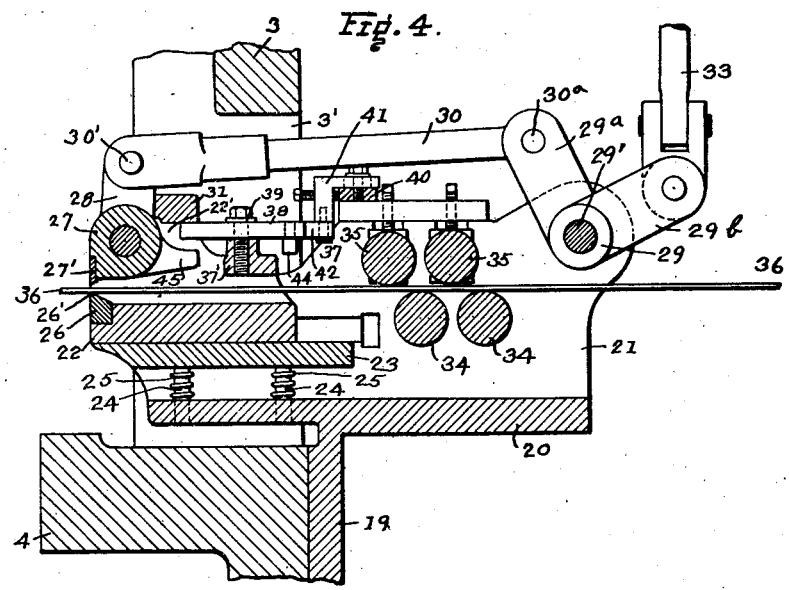
INVENTOR  
Charles Parker  
BY  
ATTORNEY

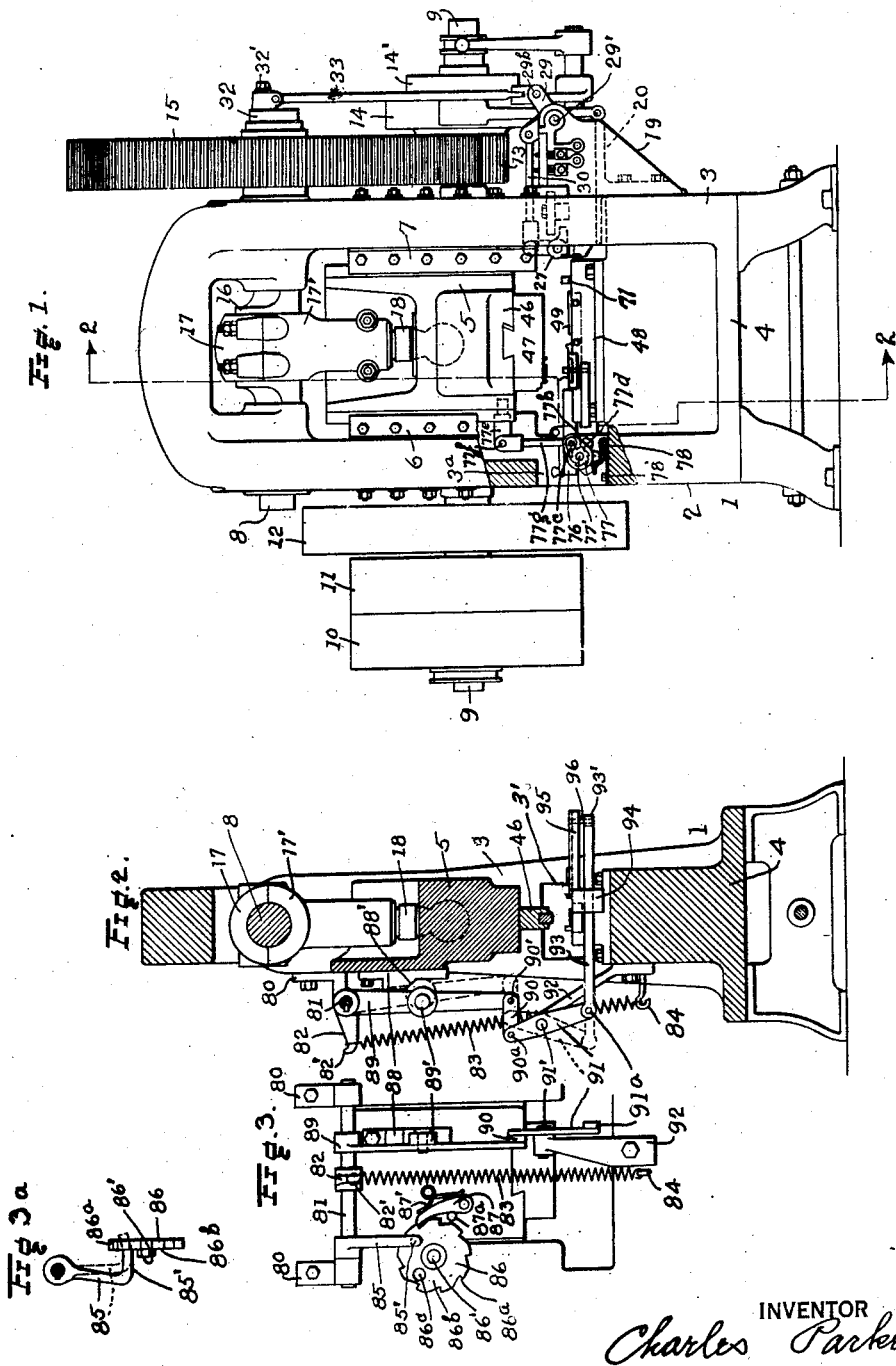

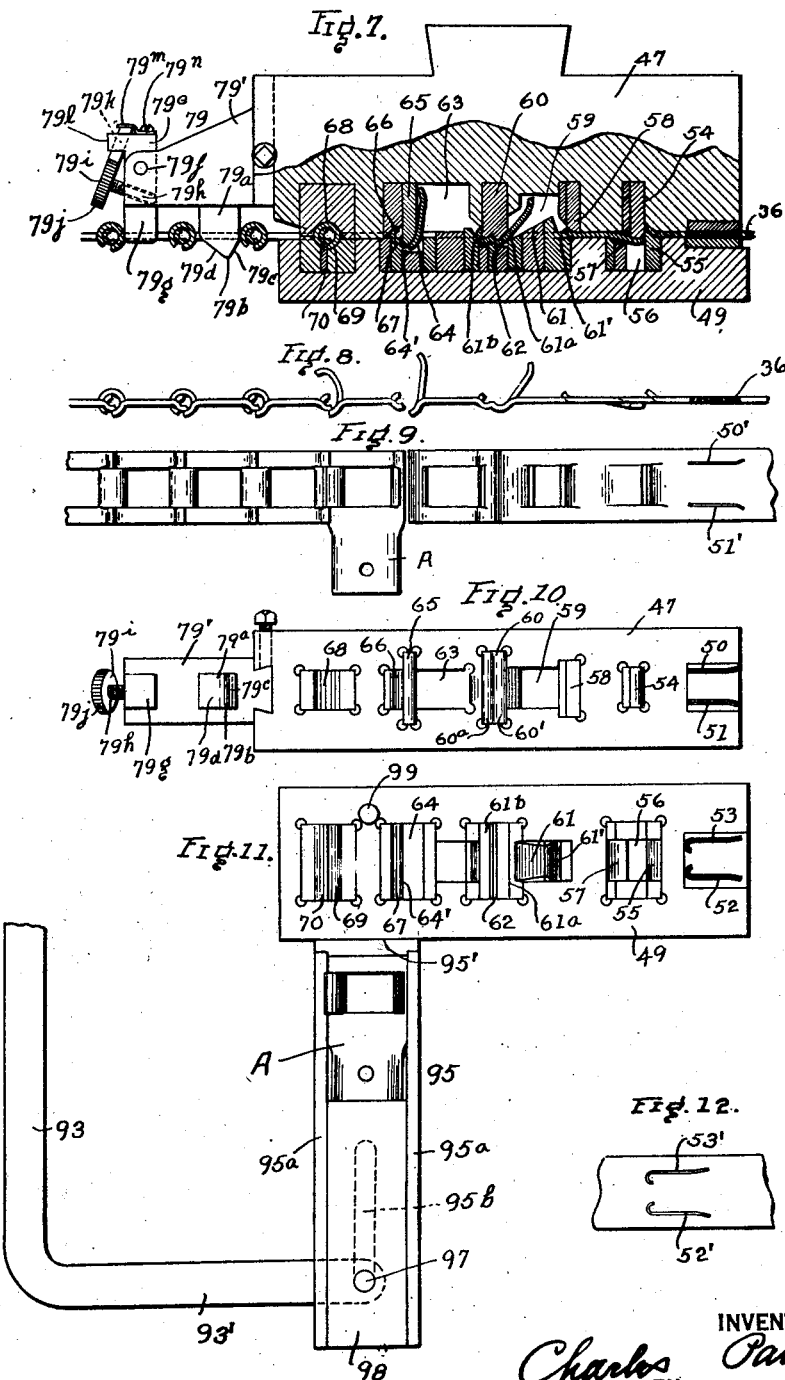

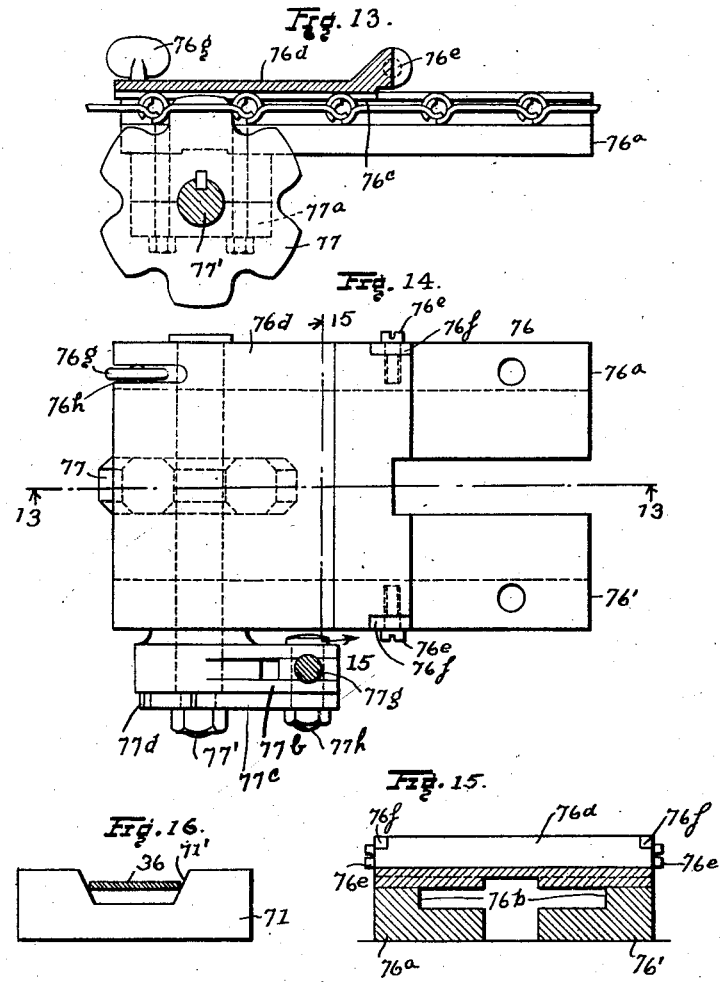

Patented Oct. 6, 1925.

1,556,538

UNITED STATES PATENT OFFICE.

CHARLES PARKER, OF BRIDGEPORT, CONNECTICUT, ASSIGNOR TO THE LOCKE STEEL CHAIN COMPANY, OF BRIDGEPORT, CONNECTICUT.

METHOD OF AND MACHINE FOR MAKING AND ASSEMBLING CHAIN LINKS.

Application filed September 17, 1921. Serial No. 501,429.

*To all whom it may concern:*

Be it known that I, CHARLES PARKER, a citizen of the United States, residing at Bridgeport, in the county of Fairfield and State of Connecticut, have invented certain new and useful Improvements in and Relating to Methods of and Machines for Making and Assembling Chain Links, of which the following is a specification.

This invention relates to improvements in methods of and machines for making chain links and assembling them, more particularly to a method of and a machine for making chains having at intervals attachments or special links. The invention is an improvement upon the processes of and machines for making chains, examples of which are shown and described in Letters Patent of the United States, No. 1,107,809 to S. D. Locke, patented August 18, 1914; and No. 1,107,831 to H. Osswald, patented August 18, 1914.

One object of the invention is to provide a novel method of making chains having special or attachment links.

Another object of the invention is to provide in a chain machine of the character described, means for interspersing or assembling with the plain links made on the machine, special or attachment links.

Elevator or conveyor chains are generally made up of sections or lengths of plain links between which are provided special or attachment links carrying wings or projections adapted to support or propel buckets, slats, conveyor elements or the like. In chain machines of which I have knowledge, it is customary to make the plain links and the special or attachment links on separate machines and to intersperse by hand the latter links in the chain or between sections of plain links. This invention provides an improved method of manufacturing chains particularly adapted for elevating or conveying purposes, and to this end means are provided for (1) transforming a strip of metal into connected plain sprocket chain links; (2) interrupting or arresting, preferably at predetermined intervals, the feeding of the strip of metal while the connected plain links are fed a step forwardly; (3) feeding to or inserting in between the last formed plain link and the forward portion of the strip of metal, a partially formed special link having a wing attachment or projection, whereby the transforming steps may be continued to complete the link formation on the special link; and (4) resuming the feeding of the strip of metal, whereby the transforming steps may be continued to complete the link formation on the plain links and to incorporate the special link in the chain between two plain links.

Other objects and advantages of the invention will be obvious from the following description of the construction and operation of a machine embodying the invention in connection with the accompanying drawings wherein I have shown one form of construction merely.

Fig. 1 is a front view, partly in section, of a machine embodying my invention;

Fig. 2 is a sectional view on line 2—2 in Fig. 1, looking in the direction of the arrows, omitting the countershaft and disclosing in side elevation the mechanism for feeding the partially completed special or attachment links to the finishing portion of the dies by which the plain links are made;

Fig. 3 is a fragmentary view of said attachment link feed mechanism detached, as when seen from the rear of the machine;

Fig. 3ª is a detail view of a portion of said attachment link feed mechanism;

Fig. 4 is an enlarged view, partly in side elevation and partly in section, of the strip feed mechanism of the machine including the mechanism for interrupting the feeding of the strip at predetermined intervals;

Fig. 5 is a front view of a portion of the strip feed mechanism, detached;

Fig. 6 is a plan view of said feed interrupting mechanism, showing portions of the strip feed mechanism in section;

Fig. 7 is an enlarged view of the dies for making the plain links, showing them in section with a strip of metal between them, and also showing a portion of the sizing or stretcher mechanism;

Fig. 8 is an edge view of a strip of metal in process of formation into a chain, some formed and coupled plain links being shown, and disclosing a special or attachment link in position to be incorporated in the chain;

Fig. 9 is a top plan view of the metal strip, special or attachment link, and plain links shown in Fig. 8;

Fig. 10 is a bottom plan view of the movable die and the sizing or stretcher mechanism;

Fig. 11 is a top plan view of the stationary die and that portion of the feed mechanism for the special or attachment links associated therewith, a special or attachment link being disclosed in position to be fed to the finishing portion of the dies;

Fig. 12 is a bottom plan view of a strip of metal showing scoring;

Fig. 13 is a section on line 13—13 in Fig. 14;

Fig. 14 is a plan view of a portion of the link extracting mechanism;

Fig. 15 is a section on line 15—15 in Fig. 14;

Fig. 16 is a front view of the metal strip guide;

Fig. 17 is a front view of a modified form of metal strip guide; and

Fig. 18 is a vertical central section illustrating the use of the modified type of strip guide on the lower die holder.

In the drawings, 1 indicates as an entirety the main frame of the machine comprising uprights 2, 3, and a bed 4 arranged between the uprights.

5 is a vertically reciprocable slide mounted to move up and down in guides 6, 7, on the main frame.

8 is a main drive shaft transversely mounted in bearings at the upper end of the frame. 9 is a countershaft transversely mounted upon the main frame and extending from one side to the other thereof. At one side of the main frame the countershaft carries a loose pulley 10, a fast pulley 11, and a fly wheel 12. At the other side of the frame the said countershaft has mounted loosely upon it a pinion 13 carrying one element 14 of a clutch, the other element 14' of which is splined to the countershaft 9. Any suitable mechanism may be employed for throwing the longitudinally movable element 14' of said clutch into and out of engagement with the element 14, so as to transmit power through the pinion 13. 15 is a gear wheel rigidly secured to said main shaft and in mesh with the pinion 13.

16 is an eccentric on the main shaft 8 connected by eccentric straps 17, 17', and pitman 18 to the slide 5.

As the construction of the press in itself forms no part of the invention, any known type of press having a reciprocatable slide and a bed or bolster beneath it may be readily adapted to operate the chain link forming and assembling mechanism to be hereinafter described, and no further description of the press shown in the drawings is deemed necessary, as this particular press has been chosen simply for illustrative purposes and not in any limiting sense.

Any suitable mechanism may be attached to the press for feeding the stock or strip of metal indicated at 36, Fig. 4 from which the chain links are to be formed across the bed or bolster of the press, and as already suggested, I incorporate in the machine in connection with this feed mechanism, other mechanism indicated as an entirety at 37, capable of interrupting or arresting the feeding of the sheet metal at preferred predetermined intervals. For the purpose of illustration I have, in the drawings, shown a feed mechanism of which 19 is a bracket secured to the standard 3 of the frame and having a horizontally disposed platform 20 the inner end of which extends into a hole or opening 3' formed in the standard 3.

21, 21, are side walls extending vertically upward, one at each side of the platform 20. 22 is a horizontally reciprocatable slide suitably mounted at either side in guideways in the said side walls 21. It rests upon a horizontally disposed friction plate 23 having downwardly extending pins 24, 24, each surrounded by a coil spring 25 bearing at its upper end against the plate 23 and at its lower end against the platform 20 so as to provide a yielding support for the slide 22 which normally tends to press the slide against the upper walls of the guide ways to insure the closing of the fed jaws before the slide commences to move forward.

26 is a gripping piece carried by the slide 22, having an upwardly turned jaw 26' adapted to engage the under surface of the stock or strip of metal 36 to be fed across the bed or bolster.

27 is an oscillatable gripping dog having a jaw 27' adapted to engage the upper surface of the strip of metal to be fed, at a point directly above the gripping jaw 26'. This gripping dog is pivotally mounted between upwardly extending lugs or ears 22', 22', on the slide 22, and carries an upwardly extending arm 28.

29 is a bell crank lever pivotally connected at 29' between the side walls 21 of the platform 20.

30 is a rod pivotally connected at 30' to the upper end of the arm 28, and at 30$^a$ to the free end of the arm 29$^a$ of the bell crank lever 29.

31 is a stop for limiting the throw of arm 28 in clockwise direction, this stop consisting of a cross-bar extending between the ears 22', 22' on the slide 22.

32 is a crank disk carried by the main shaft 8 and having a crank pin 32' to which is pivotally connected one end of a connecting rod 33, the other end of which is suitably connected to the free end of the arm 29$^b$ of the bell crank lever 29.

34, 34, 35, 35 are straightening rolls for the strip of metal or stock 36. These rolls are horizontally disposed and suitably mounted between the side walls 21, 21 on the platform 20. The strip of metal 36 is directed between the rolls 34, 34, and 35, 35, and between the gripping lips 26' and 27'.

The dog 27 and arm 28 are shaped and proportioned to have a slight rocking motion relative to the slide 22, so that in normal operation, as the connecting rod is drawn to the right in Figs. 1 and 4, the gripping jaw 27' is rocked out of engagement with the upper surface of the strip of metal 36. The arm 28 then engages the stop 31 and the slide 22 recedes with the connecting rod 30. Upon the reversal of travel of the rod 30, it ordinarily rocks forward the upper end of the arm 28 and causes the gripping jaw 27' to engage the upper surface of the strip 36, thereby gripping the said strip firmly between the jaws 26' and 27', and the slide 22 and strip 36 are together fed forward.

Of the feed interrupting or arresting mechanism 37, which is best shown in Figs. 4 and 6, 37' is a cross-bar extending between ears 22', 22' on the slide 22, and 38 is a horizontally positioned ratchet wheel rotatably and removably mounted on a vertical shaft 39, suitably supported in the cross-bar 37'.

40 is a cross-bar extending between side walls 21, 21, of the platform 20 and adjustably supporting a bracket 41. 42 indicates a pawl or dog pivotally mounted on the bracket 41. The free end of the pawl 42 is disposed in the path of movement of a tooth on the ratchet wheel 38, so that each time the slide 22 is moved rearwardly by the rod 30, one tooth of the ratchet wheel 38 will engage the pawl 42 and be rotated the distance of one tooth thereby.

44 is a pin or abutment carried by the ratchet wheel 38, upon its under side and arranged to engage a tail piece or lug 45 extending rearwardly from the dog 27.

From the foregoing description it will be seen that when the pin 44 is above and in alignment with the tail piece 45, the latter will engage the pin 44 and prevent a gripping action of the jaw 27' upon the metal strip 36; accordingly the slide 22 will move forwardly without feeding the strip 36. As the ratchet wheel 38 is moved one tooth in each return stroke of the slide 22, it follows that in the succeeding forward movement of the slide 22, the dog 27 will be free to operate and thus cause a forward feed to the strip 36. The tail piece 45 engages the pin 44 and interrupts or arrests the feeding of the strip 36 once in each revolution of the wheel 38, so that there will be as many feeds forward step by step of the strip 36 as there are teeth in the wheel 38, but one. As a plain link is formed at each forward movement or feed of the strip 36, it follows, that there will be as many plain links provided in the sections between adjoining special links as there are teeth in wheel 38, but one. By varying the number of teeth in the wheel 38 or providing a plurality of pins 44, which may be spaced uniformly or otherwise, the number of plain links in each section may be increased or decreased. The forward circumferential edge of the ratchet wheel 38 is positioned under and closely adjacent the stop 31, said stop reinforcing the ratchet wheel when the lug and pin are in engagement.

Any suitable dies or forming elements may be employed for striking up and forming each chain link from a strip of metal and coupling it to the next preceding link. In the drawings I have shown the use of two rigid dies for this purpose which are capable of use in connection with the features of the present invention, one of said dies being movable and the other stationary.

Of the die and forming mechanism herein shown, 46 is a carrier or holder for the movable die, it being suitably connected to the slide 5. 47 represents as an entirety the movable die, it being suitably seated and held in the holder 46.

48 represents a bolster or die bed for the stationary die. It is detachably secured to the bed 4 in any suitable manner. 49 represents as an entirety a stationary die suitably secured in the die bed 48.

The dies 47 and 49, which cooperate with each other to form and assemble the links, are arranged in longitudinal alinement with the line of feed of the strip 36 and are properly centered relative to said line of feed.

50, 51, are scoring knives or chisels arranged at the right hand end of the movable die 47 and adapted to impart lines of score to the upper surface of the strip of metal, and 52, 53, are corresponding scoring knives or chisels carried by the stationary die 49 and arranged to impart lines of score 52', 53', respectively, to the under surface of the strip of metal, (see Fig. 12), each of which lines is directly beneath a line of score 50' or 51' (see Fig. 9), imparted by one of the upper scoring knives.

Of the dies 47 and 49, 54 is a severing and crimping element on the upper die having a convex crimping surface. It is arranged to cooperate with a cutting and bending knife 55 on the lower die. The lower die is recessed at 56 in front of the cutting knife 55 and beneath the severing and crimping element 54. The metal of the stationary die 49 in front of the recess 56 is cut away along the inclined line 57 to permit a section of the metal of each link blank to be bent downwardly by the severing and crimping element 54 before it has been severed at one end by the combined action of this element and knife 55.

58 is a curved forming or crimping element on the movable die 47, about which the metal for forming the smaller end bar or pintle of each link is bent or crimped. In front of this finger 58 is a recess 59, and in front of it is an irregular shaped end bar forming punch element 60 consisting of two substantial quarter circles 60′, 60ª.

61 is a forming and bending projection on the stationary die, it being adapted to enter the recess 59 in the movable die. 61′ is a shoulder on the projection 61 adapted to fold or crimp the metal for the small end of the link against the curved end of the element 58 on the movable die.

62 is a scoring knife on the stationary die adapted to impart a transverse score to the strip of metal along the line of severance of two links which are to adjoin each other and in conjunction with the forming corners 61ª, 61ᵇ, is adapted to force the metal of the link to follow the quarter circles 60′, 60ª, on the former 60. This scoring knife 62 is in vertical alinement with the line of intersection of the said two quarter circles of the punch element 60. In advance of the said punch element 60 the movable die is recessed as indicated at 63 to allow clearance for the free upturning of the long lip of the metal blank for a link, which at this step of its formation projects upwardly from the metal strip. At 64 the stationary die is recessed to receive a cutting or severing knife 65 on the movable die, the edge 64′ being a knife edge to work in conjunction with the knife 65 to sever the metal strip. Immediately in front of the cutting knife 65, the movable die is shaped as indicated at 66 to complete the rounding and formation of the small end bar of each link in cooperation with the recessed section 67 of the stationary die. At 68 the movable die is recessed for the purpose of engaging the longer section or lip of metal turned up from the central portion of each link blank and bending, curling and conforming it to the cylindrical shape desired, at the same time causing it to encircle the small end bar or pintle of the link in front of it, thereby coupling or attaching these links together. The stationary die is recessed at 69 to cooperate with the recessed portion 68 of the movable die in the final shaping and forming of the large end bar of each link.

70 is a projection extending transversely across the recessed portion 69 of the stationary die. It serves to prevent the ends of the lips of metal forming the large end or sprocket bar of each link from engaging with each other, and to space them apart a predetermined distance.

71 is a strip gage for centering the metal strip 36 relatively to the forming dies as it is fed forward, it preferably consisting of a bar of metal arranged transversely on the stationary die bed and suitably secured in position a little distance from the scoring chisels 52 and 53. In the top of this bar of metal is a V-shaped groove 71′ with the axis of the V in the vertical central longitudinal plane of the dies. The walls of this V-shaped groove are preferable elevated somewhat above the horizontal plane of the stationary die and the width of the groove at its middle vertically is preferably of the width of the standard size strip to be used with the set of dies to which the gage is attached. The taper of this gage allows for variation in width of the strip of metal 36, so as to insure the proper centering of the strip despite its variation in width.

In Figs. 17 and 18 I have shown a modified form of strip gage to be used with strips of metal that are quite thin and do not possess sufficient spring action to insure that their free ends will spring up away from the stationary die when the movable die is elevated. 72 is a block of metal detachably secured to the die bed 48. It has formed in it an inverted V-shaped groove 72′. In front of this gage 72 the metal of the die bed is vertically recessed, as at 73, to receive a spring pin 74 which is normally pressed upwardly by a spring 75. The operation of this modified form of gage will be readily understood.

Mechanism may be employed for extracting and guiding the formed chain links out of the machine, of any suitable character. For illustration, I have shown a chain guide 76 comprising two bars 76′, 76ª, rigidly secured at their inner ends to the die bed 48, and projecting into the opening 3ª through the adjacent wall of the main frame of the machine. These bars are longitudinally grooved and recessed as indicated at 76ᵇ to constitute a guide way for the chain. The bars are recessed at 76ᶜ to receive a cover plate 76ᵈ which is pivotally connected at 76ᵉ between upwardly projecting ears 76ᶠ on the said guide bars. 76ᵍ is a thumb nut extending through a slot 76ʰ in the cover plate 76ᵈ and detachably fitted into the guide bar 76ª, for the purpose of holding down the cover plate.

77 is a sprocket wheel arranged between and projecting between the guide bars 76′, 76ª. It is carried by a shaft 77′ mounted in bearing blocks 77ª, each detachably secured to one of the aforesaid guide bars. 77ᵇ is a pawl carrying arm loosely mounted on the shaft 77′. 77ᶜ is a pawl pivotally connected to the arm 77ᵇ. 77ᵈ is a ratchet wheel rigidly secured to the shaft 77′ and having its teeth in the plane of the pawl 77ᶜ. 77ᵉ is a lug or projection carried by the slide 5. It is pivotally connected at 77ᶠ to a rod 77ᵍ, the lower end of which is pivotally connected at 77ʰ to the pawl arm 77ᵇ.

78 is a spring having one end secured at 78′ to the frame of the machine, and its other end bearing against the teeth of the sprocket wheel 77 to offer a frictional resistance to the rotation of the latter.

Any suitable mechanism may be employed for the purpose of correcting the size and pitch of the chain links. The size and pitch correcting mechanism is indicated as an entirety by 79. 79' is an arm extending forward from and preferably detachably secured to the die holder 47. This arm 79' has formed preferably integrally with it, a downwardly extending finger 79ª which is pointed at its lower end as indicated at 79ᵇ, the rear surface 79ᶜ of the said pointed finger being shorter than and at a greater inclination to the horizontal than the front surface 79ᵈ of the said finger. This finger 79ⁿ, is arranged to enter the sprocket opening in the last link but one of the links formed in the machine. 79ᵉ is a block or finger pivotally connected at 79ᶠ in the bifurcated end of the arm 79'. This block or finger extends downwardly beneath the arm 79', as indicated at 79ᵍ and is adapted to enter the sprocket opening in the link next preceding the link entered by the finger 79ª. 79ʰ is an adjustment screw fitted in the finger 79ᵉ and adapted to extend on the rear side of the latter and bear against the arm 79'. Its purpose is to adjust the said finger about the axis of the pivot 79ᶠ and toward or from the finger 79ª. The adjustment wheel 79ⁱ for the screw 79ʰ has a toothed or serrated periphery 79ʲ.

79ᵏ is a lock pawl extending through an opening in the forward projection 79ˡ of the finger 79ᵉ and engaging with the periphery of the thumb wheel to hold the wheel at any point of adjustment. 79ᵐ is a spring bearing at one end against the lock pawl 79ᵏ and having its other end secured at 79ⁿ to the finger 79ᵉ.

The distance between the front wall of the downward extension 79ᵍ of the finger 79ᵉ and the rear wall of the finger 79ª remains substantially constant when the machine is in operation. If a link is shorter in pitch than it should be, these sizing fingers will bring it up to proper pitch by stretching it.

The operation of the machine as thus far described will be readily understood. A strip of metal 36 is directed through the feed mechanism until the gripping jaws 26', 27', of the feed mechanism can engage with it. Power is then applied through the countershaft 9 to actuate the strip feed mechanism and slide 5. The strip is guided and centered by the gage so as to lie properly between the dies 47 and 49. When the slide 5 descends the scoring knives impart to the upper surface of the strip of metal lines of score, and the scoring chisels likewise impart lines of score to the under surface of said strip. When the slide next ascends, the feed mechanism feeds forward the strip of metal one step and the first forming elements of the dies operate on the strip. The strip is fed forward step by step at each elevation of the slide, the dies acting on each link blank to form a completed link. After the first completed link has been formed, the operator extracts it from the dies and positions it to be coupled to the next succeeding link. The operator continues to extract and advance the links thus formed and coupled together until the first one of said links is engaged by a tooth on the sprocket wheel 77. Thereafter the extracting mechanism operates to automatically extract the chain links from the dies and advance them one step at a time. As the slide descends after the last formed link has been extracted by the extracting mechanism, the pitch correcting mechanism properly centers said link relative to the final link forming elements of the dies. The pitch corecting or sizing fingers operate at each descent of the slide to enter two coupled links in the chain guide to stretch said links up to gage, if required.

As already described, when the pin 44 is in alinement with the lug 45, in the rotation of the ratchet 38, and the slide 5 ascends, the feeding of the sheet metal is interrupted, but the extracting mechanism continues to operate to advance a single step the links, which, in carrying out the transformation steps, have been connected. The result is that the link last formed and severed from the metal strip is moved one step forward, leaving a link space on the finishing portion of the stationary die, between the link sections which were advanced one step and the metal strip which was interrupted or arrested. The mechanism yet to be described co-operates to feed a partially completed special or attachment link to said finishing portion of the stationary die, at the limit of that ascent of the slide 5 ocurring when said link space is produced in the manner just described, and in position to be incorporated in the strand of chain.

Each partially completed special or attachment link is not only fed to the exact position on the stationary die which the partially completed plain link, for which it is substituted, would normally occupy had interruption not been effected, but the partially completed attachment links are of the same size and preferably of the exact construction as said metal strip or link section at the point or step at which the special link is inserted or positioned, except that each special link has additionally an attaching portion A, best shown in Figs. 9 and 11. It will be noted that the grooves 76ᵇ in the bars of the chain link extracting mechanism (Fig. 15) are of sufficient depth to allow free passage of the attaching portions A.

Of the feed mechanism for the partially completed special or attachment links, 80 represents a pair of brackets mounted upon the rear faces of the upper portions of the uprights 2 and 3, respectively, and providing bearings for a rock shaft 81 extending from one side to the other of the main frame.

82 is a horizontally disposed arm fixed upon the rock shaft 81 and extending rearwardly therefrom, having at its outer end a hook portion 82' adapted to hold one end of a coil spring 83 the opposite end of which is held by a hook 84, supported in the bed 4.

An L-shaped member fixed upon the rock shaft 81 consists of a vertically disposed, downwardly extending arm 85 merging into a horizontally disposed, forwardly extending, preferably hook shaped arm 85'. 86 is a vertically disposed ratchet rotatably mounted upon the rear face of the upright 3 of the main frame, as indicated at 86', and 87 is a pawl pivoted upon the slide 5 to engage the teeth 86ª of said ratchet. A spring 87' and a stop 87ª on the slide 5 insure the proper working position of the pawl. The free end of the arm 85' is normally pressed against the rear face 86ᵇ of the ratchet 86 by the influence of the spring 83, acting through the arm 82 and shaft 81. 86ᶜ is a hole through said ratchet positioned to at intervals aline with the free end of the arm 85', to permit operation of the rock shaft 81 by the spring 83.

88 is a block fixed upon the slide 5 and having a transversely disposed cam face 88' extending downwardly and forwardly of said block.

89 is a vertically disposed lever fixed upon the rock shaft 81 and extending downwardly therefrom; 89' is a roller mounted upon the lever 89 intermediate its ends and adapted to engage the cam face 88'. 90 is a horizontally disposed link the forward end of which is pivoted upon the lower end of the lever 89, as indicated at 90', and the rearward end of which is pivoted, as indicated at 90ª, upon the upper end of a lever 91, itself pivoted intermediate its ends, as indicated at 91', upon a bracket arm 92 extending from the bed 4. The lower end of the lever 91 is pivoted, as indicated at 91ª, to a horizontally disposed L-shaped attachment link feed member the arm 93 of which extends directly forward and beyond the front of the main frame and is slidably mounted in a bearing block 94 fixed to the left hand end of the stationary die holder 48 and arranged beneath the chain guide of the link extracting mechanism, and the arm 93' of which extends a short distance from left to right in spaced relation to the front side of the stationary die holder.

95 is an attachment link receiving member positioned so that the top surface of its inner end 95' is flush with the top surface of the stationary die 49, and so that said inner end is in alinement with the position on the stationary die to which the special or attachment links are to be at intervals fed. This receiving member 95 has at its side edges suitably shaped upturned flanges 95ª for the obvious purpose of guiding the special or attachment links.

The attachment link receiving member 95 is also provided with a longitudinal slot 95ᵇ adapted to slidably receive a pin 96 projecting upwardly from the free end of the arm 93' and attached, as indicated at 97, to a feed plate 98 arranged between the flanges 95ª of the receiving member 95 and adapted to reciprocate upon said receiving member.

99 is a stop for the special or attachment links, positioned upon the finishing portion of the stationary die.

As hereinbefore suggested, the special or attachment links may be partially completed on a separate machine and afterwards successively placed upon the receiving member 95 in front of the feed plate 98, as very clearly shown in Fig. 11 of the drawings, in position to be automatically fed at predetermined intervals to the proper location on the finishing portion of the die. The attachment links may be so placed upon the receiving member 95 in any preferred manner, either by hand or by suitable mechanism of some particular construction forming no part of the present invention.

The manner in which the attachment link feed mechanism operates will be obvious. Upon each upward movement of the slide 5, the pawl 87 engages a tooth 86ª of the ratchet 86 to rotate said ratchet one step. The coil spring 83 at all times tends to rotate the rock shaft 81 to swing the vertically disposed lever 89 forwardly, but forward swinging of said lever is normally prevented by the engagement of the hook arm 85' with the rear face 86ᵇ of the ratchet 86.

The ratchet 86 is made to have the same number of teeth as possessed by the ratchet wheel 38 of the strip feed interrupting mechanism, and the hole 86ᶜ in said ratchet 86 is positioned to be in alinement with the free end of the arm 85' when the slide 5 is at the limit of that ascent occurring when the feeding of the sheet metal is interrupted to produce a link space on the finishing portion of the stationary die. For each pin 44 utilized, spaced at uniform or varying distances about the ratchet wheel 38, there must be a corresponding hole 86ᶜ in the ratchet 86, as will be evident.

At the instant the slide is at the limit of that ascent just mentioned, the arm 85' enters the hole 86ᶜ, the spring 83 operating to rotate the rock shaft to swing the lever 89 forwardly, and said lever 89, through the instrumentality of the link 90, rotates the lever 91 on its pivot to cause the arm 93 of the attachment link feed member to slide rearwardly in the bearing block 94, and the arm 93' of said attachment link feed member to actuate the feed plate to move the attachment link at the particular time in the link receiving member to its proper position on the finishing portion of the stationary die. The roller 89' is located to engage the cam face 88' when the lever 89 swings forwardly as just described, and upon the succeeding descent of the slide, said cam face travels over said roller to swing the lever 89 backward to normal position, withdrawing the arm 85' from the hole 86ᶜ. As soon as the slide again starts to ascend, the pawl 87 rotates the ratchet 86 a sufficient distance to remove the hole 86ᶜ from its position of alinement with the free end of the hook arm 85', before the higher portion of the block 88 has been sufficiently elevated to release the roller 89'. The movement of the vertically disposed lever 89 to normal position, obviously, returns the feed plate to its normal position, that is, to the position in which it is shown in Fig. 11.

It is to be noted that the attachment link feed mechanism does not operate until after the link extracting mechanism has advanced the plain links one step, so that there is no possibility of interference by the plain links with the ready feeding of the attachment links. It is to be further noted that upon the particular descent of the movable die which connects an attachment link with the plain link preceding it, the forming elements of the dies can make no further impression upon the strip of metal.

Many alterations in the construction, and many apparently widely differing embodiments and applications of the invention will suggest themselves to those skilled in the art of making chain making machines and elevator or attachment chains, without departing from the scope and spirit thereof. The disclosures and descriptions herein are purely illustrative, and are not intended to be in any sense limiting.

What I claim is:

1. The method of making chains having special links, which consists in providing a strip of metal, in simultaneously performing step by step operations upon a plurality of sections of said strip to form links, in providing special links from a source of chain material supply other than said strip of metal, and in connecting said links and special links in a single strand of chain with special links interposed between links.

2. The method of making chains having special links, which consists in providing a strip of metal individual sections of which are to supply links, in simultaneously performing step by step operations upon a plurality of said sections to form links, the operation on each of said plurality of sections being different from the operations on all others of said sections, in providing special links from a source of chain material supply other than said strip of metal, and in connecting said links and special links in a single strand of chain with special links interposed between links.

3. The method of making chains having special links, which consists in providing a strip of metal individual sections of which are to supply links, in simultaneously performing step by step bending operations upon a plurality of said sections to successively form links, in providing special links from a source of chain material supply other than said strip of metal, in interspersing said special links with said links as the latter reach a predetermined stage of completion, and in connecting said links and special links in a single strand of chain.

4. The method of making chains having special links, which consists in providing a strip of metal individual sections of which are to supply links, in simultaneously performing a plurality of step by step operations upon a plurality of said sections to form links, in providing special links from a source of chain material supply other than said strip of metal, in interposing special links between said links at predetermined stages of their completion, and in connecting said links and special links in a single strand of chain.

5. The method of making chains having special links, which consists in simultaneously performing a series of step by step operations upon a plurality of sections of a strip of metal to provide links, in providing special links from a source of chain material supply other than said strip of metal, in causing relative movement between portions of the strip to form a link space between certain of said sections, in inserting into said link space a special link, and in connecting links and special links in a single strand of chain consisting of at least one link and one special link.

6. The method of making chains having special links, which consists in providing a strip of metal individual sections of which are to supply links, in simultaneously performing a series of step by step operations upon a plurality of said sections to form links, in causing relative movement between certain of said sections to form a link space, in inserting into said space a special link, and in connecting links and special links in a single strand of chain.

7. The method of making chains having special links, which consists in providing a strip of metal individual sections of which are to supply links, in simultaneously performing step by step operations upon a plurality of said sections to successively form links, in providing special links, in interposing special links at intervals between said sections, and in connecting said links and special links in a strand of chain.

8. The method of making chains having special links, which consists in providing a strip of metal individual sections of which are to supply links, in simultaneously performing step by step operations upon a plurality of said sections to successively form links, in providing special links, in causing relative movement between certain of said sections to form a link space, in inserting into said link space a special link, and in connecting links and special links in a strand of chain.

9. The method of making chains having special links, which consists in providing plain links by simultaneously performing step by step operations upon a plurality of sections of a strip of metal to successively transform each of said sections into plain links, in providing special links, in interposing special links at intervals between two of said plain links, and in connecting said plain links and special links in a single length of chain composed of strands constituted by at least one plain link and one special link.

10. The method of making chains having special links, which consists in providing plain links by simultaneously performing step by step operations upon a plurality of sections of a strip of metal to successively transform each of said sections into plain links, in providing special links, in causing relative movement between certain of said sections to provide a link space, in inserting into said link space a special link, and in connecting plain links and special links successively in a strand of chain.

11. The method of making chains having special links, which consists in simultaneously performing step by step operations upon a plurality of sections of a strip of metal to successively transform said sections into links each of which has side bars, a relatively small end bar and a relatively large end bar or hook, in providing special links each having a relatively small end bar and a relatively large end bar or hook, in interposing special links at intervals between two of said links, and in connecting said links and special links into a strand of chain by joining each relatively large end bar or hook of each link or special link with the relatively small end bar of an adjacent link or special link.

12. The method of making chains having special links, which consists in simultaneously performing step by step operations upon a plurality of sections of a strip of metal to successively transform said sections into links each of which has side bars, a relatively small end bar and a relatively large end bar or hook, in providing special links each having a relatively small end bar and a relatively large end bar or hook, in causing relative movement between certain of said sections to provide a link space, in inserting into said link space a special link, and in connecting links and special links into a strand of chain by joining each relatively large end bar of each link or special link with the relatively small end bar of an adjacent link or special link.

13. The method of making chains having special links, which consists in successively transforming a strip of metal into connected similar links, feeding forward said similar links and strip during the transforming operations upon said strip, interrupting the feeding movement of said strip at predetermined intervals and simultaneously feeding said similar links forward to produce a link space between said connected links and said strip, and incorporating a special link in said link space and connecting the same with the next preceding link of said connected links.

14. The method of making chains having special links, which consists in successively transforming a strip of metal into connected similar links, feeding forward said similar links and strip during the transforming operations upon said strip, then interrupting the feeding movement of said strip at predetermined intervals and simultaneously feeding said similar links forward to produce a link space between the connected links and said strip, then incorporating a special link in said link space and then continuing the feed of said strip and successively connecting the connected links to the special link and subsequently formed similar links.

15. The method of making chains having special links, which consists in transforming a strip of metal into similar links, feeding forward said strip and links during the transforming operations upon said strip, severing each link as completed from the strip of metal and connecting it with the next preceding link, interrupting the feeding movement of said strip at intervals while moving forward said connected links to provide a link space between said connected links and said strip of metal, positioning a specal link in said link space and connecting the same with the last one of said connected links, and then continuing the feed of the strip and connecting the next succeeding similar link as severed from the strip with said special link.

16. The herein disclosed process of forming chain progressively which consists in feeding material to and between a plurality of bending and transforming elements, causing relative movement between portions of the material being transformed to form a space therebetween, and then feeding to such space other material for incorporation with and between said portions.

17. The herein described process of forming a chain having special links, which consists in feeding forward a strip of metal and progressively forming said strip step-by-step into connected links, then interrupting the feed of said strip to form a link space between certain of the links, feeding into said space a separate link corresponding in shape and size to the link section formed therein in said step-by-step formation, and then connecting said special link in the chain.

18. The herein described process of forming a chain having special links, which consists in transforming a strip of metal into connected links progressively step-by-step, causing relative movement between portions of the strip which is undergoing transformation to form a link space, and then in inserting into said space a special link shaped for incorporation into said chain as said transformation continues.

19. The herein described process of forming a chain having special links, which consists in transforming a strip of metal into connected links progressively step-by-step and feeding the strip and connected links relative to the transforming elements, then in interrupting the feed of the strip to form a space in or between portions of the material being transformed, then feeding into the space resulting from the feed interruption a special link shaped for incorporation into the said chain as transformation continues.

20. The method of making from sheet steel drive chain having special attachments, which consists in partially forming from such steel links carrying the desired attachment, transforming step-by-step a strip of said steel into connected chain links, periodically stopping said transformation and advancing the last completed link one step, interspersing one of said attachment links between and connecting it to said last completely formed link and the next link to be formed from said strip.

21. The method of making from sheet steel drive chain having special attachments, which consists in partially forming links carrying the desired attachment, transforming step-by-step a strip of steel into connected chain links, advancing the completed links as formed, periodically stopping said transformation while permitting said advancing of the completed links one step, and interspersing one of said attachment links between and connecting it to the last completely formed link and the next link to be formed from said strip.

22. In a machine of the character described, the combination with means for successively providing plain links by simultaneously performing a series of step by step operations upon a plurality of sections of a strip of metal, of means for providing special links, means for interspersing the special links with said links while the latter are in a predetermined stage of completion, and means for connecting each plain link and special link in a strand of chain.

23. In a machine of the character described, the combination with means for providing plain links from a strip of metal by simultaneously performing a series of step by step operations upon a plurality of sections of said strip which are to furnish links, of means for providing special links to be connected in the strand of chain between said plain links, means for interspersing the special links with said plain links while the latter are in a predetermined stage of completion, and means for connecting each plain link and special link in a strand of chain.

24. In a machine of the character described, the combination with means for transforming a strip of metal into a series of connected similar links, each of said links having side bars, a relatively small end bar and a relatively large end bar or hook, of means for interspersing special links with said similar links, each special link also having a relatively small end bar and a relatively large end bar or hook, the means being adapted to situate the relatively large end bar or hook of each special link in position to be bent about the relatively small end bar of a similar link.

25. In a machine of the character described, the combination with means for transforming a strip of metal into a series of connected similar links, each of said links having side bars, a relatively small end bar and a relatively large end bar or hook, of means for intermittently interspersing and connecting special links with said similar links, each special link also having a relatively small end bar and a relatively large end bar or hook, the interspersing means being adapted to situate the relatively large end bar or hook of each special link in position to be bent about the relatively small end bar of a similar link.

26. In a machine of the character described, the combination with means for transforming a strip of metal into a series of connected similar links, each of said links having side bars, a relatively small end bar and a relatively large end bar or hook, of means for interspersing partially completed special links with said similar links during the transforming thereof, each special link also having a relatively small end bar and a relatively large end bar or hook, the means being adapted to situate the relatively large end bar or hook of each partially completed special link in position to be bent about the relatively small end bar of a similar link.

27. In a machine of the character described, the combination with means for transforming a strip of metal into a series of connected similar links, each of said links having side bars, a relatively small end bar and a relatively large end bar or hook, of means for interspersing partially completed special links between and connecting two of said similar links by means of one special link, each special link also having a relatively small end bar and a relatively large end bar or hook, the interspersing means being adapted to situate the relatively large end bar or hook of each special link in position to be bent about the relatively small end bar of a similar link, and the relatively small end bar in position to have the relatively large end bar or hook of a similar link bent about special link small end bar.

28. In a machine of the character described, the combination with means for transforming a strip of metal into connected chain links, each link having side bars, a relatively small end bar and a relatively large end bar or hook, of means for incorporating special links each having a relatively small end bar and a relatively large end bar or hook in the strand of chain at predetermined intervals, the means being adapted to associate the relatively large end bar or hook of each special link with a relatively small end bar of said strand of chain.

29. In a machine of the character described, the combination with means for transforming a strip of metal into connected chain links, each link having side bars, a relatively small end bar and a relatively large end bar or hook, of means for incorporating special links each having a relatively small end bar and a relatively large end bar or hook in the strand of chain between said sections, the means being adapted to join the relatively large end bar or hook of each special link with a relatively small end bar of said strand of chain, and the relatively small end bar of each special link with a relatively large end bar or hook of said strand of chain.

30. In a machine of the character described, the combination with a stationary die and a movable die adapted to transform a strip of metal into a series of connected similar links by performing step by step operations upon said strip, of means for feeding special links to said dies to be incorporated by the action of said dies in the strand of chain between certain of said similar links.

31. In a machine of the character described, the combination with a stationary die and a movable die adapted to transform a strip of metal into a series of connected similar links by performing step by step operations upon each section of said strip to provide a similar link, of means for feeding partially completed special links to said dies to be incorporated by the action of said dies in the strand of chain between certain of said similar links.

32. In a machine of the character described, the combination with means for transforming a strip of metal into connected similar chain links, devices for feeding said strip of metal and connected links forward as said transforming means is operating, and means for interrupting the feeding of said strip at predetermined intervals while feeding forward said connected links, whereby a link space is produced between said connected links and strip, of means for feeding a special link to said link space and in position to be incorporated in the strand of chain.

33. In a machine of the character described, the combination with means for transforming a strip of metal into connected similar chain links and means for simultaneously feeding said strip and connected links forward step-by-step as said transforming means is operating, of devices for interrupting the forward feeding of said strip at predetermined intervals while said connected links are moved forward one step, and means for feeding a partially completed special link in position to be incorporated in the strand of chain.

34. In a machine of the character described, the combination with a stationary die and a movable die adapted to transform a strip of metal into connected similar chain links, and devices for feeding said strip and connected links forward during the transforming operation, of devices for interrupting the feeding movement of said strip of metal to produce a link space between said dies, and means for feeding a partially completed special link to said space and in position to be incorporated in the strand of chain.

35. In a machine of the character described, the combination with a stationary die and a movable die adapted to transform a strip of metal into connected similar chain links, and devices for giving said strip and connected links step-by-step forward movements during the transforming operation upon said strip, of devices for feeding said connected links forward while said strip of metal remains in stationary position, and means for feeding a special link to said dies and in position to be incorporated with the connected links and links subsequently formed from said strip.

36. In a machine of the character described, the combination with means for transforming a strip of metal into similar chain links, devices for feeding said strip and similar links forward step-by-step, and means for severing each link as completed from the strip of metal and connecting it with the next preceding link, of devices for feeding said connected links forward while said strip of metal is stationary, whereby a link space is produced between said connected links and strip, and means for feeding a special link to said link space and in position to be incorporated in the strand of chain.

37. In a machine of the character described, the combination with means for transforming a strip of metal into connected chain links, said means including devices for simultaneously feeding said strip and links forward step-by-step, of mechanism for intermittently interrupting the feeding movement of said strip while said connected links feed forward.

38. In a machine of the character described, the combination with devices for feeding a strip of metal forward step-by-step, of mechanism for interrupting at intervals the feeding movement of said strip of metal, said strip feed devices including a reciprocatable slide and a gripping dog thereon adapted to normally grip said strip against the slide as said slide moves forward and adapted to release said strip as said slide moves rearward, and said strip feed interrupting mechanism including a rotatable ratchet upon said slide, a pin extending from said ratchet, and a lug extending from said gripping dog to at intervals engage said pin to withhold said gripping dog from said strip of metal during certain forward movements of said slide.

39. In a machine of the character described, the combination with devices for feeding a strip of metal forward step-by-step, of mechanism for at intervals interrupting the feeding movement of said strip of metal, said strip feed devices including a reciprocatable slide and a gripping dog mounted to have a rocking motion relative thereto and to normally grip said strip against the slide as said slide moves forward and adapted to release said strip as said slide moves rearward, and said strip feed interrupting mechanism including a ratchet movable with said slide, a pawl carried by a fixed part and adapted to rotate said ratchet one step upon each rearward movement of said slide, a pin projecting from said ratchet, and a lug extending from said gripping dog and adapted to at intervals engage said pin to withhhold the gripping dog from said strip during certain forward movements of said strip.

40. In a machine of the character described, the combination with means for transforming a strip of metal into connected similar chain links, devices for simultaneously feeding said strip and connected links forward step-by-step, and means for at intervals interrupting the feeding movement of said strip while said connected links are fed forward, of mechanism for feeding special links in position to be incorporated in the strand of chain, said special link feed mechanism including a link receiving member associated with the strip transforming means, and devices for moving the special links from said receiving member and placing the same contiguous with a portion of the strip transforming means.

41. In a machine of the character described, the combination with a stationary die and a movable die adapted to transform a strip of metal into connected similar chain links, devices for simultaneously feeding said strip and connected links forward step by step, and means for at intervals interrupting the feeding movement of said strip while said connected links are fed forward, whereby a link space is produced upon the finishing portion of the dies, of mechanism for feeding special links in position to be incorporated in the strand of chain, said special link feed mechanism including a link receiving member associated with said dies, and devices for moving a special link from said receiving member to each link space as produced.

42. In a machine of the character described, the combination with means for forming a series of connected chain links, said means including a stationary die and a movable die, of mechanism for interspersing special links in the strand of chain, said mechanism including a special link receiving member associated with said dies, a reciprocatable feed plate associated with said receiving member, and devices for actuating said feed plate.

43. In a machine of the character described, the combination with means for forming a series of connected chain links, said means including a main frame and a stationary die and a movable die mounted therein, of mechanism for interspersing special links in the strand of chain, said mechanism including a special link receiving member associated with said dies, a reciprocatable feed plate associated with said receiving member, a rock shaft mounted upon the main frame, a lever fixed to the rock shaft, connections between said lever and feed plate, means tending to rotate said rock shaft to actuate said feed plate, devices for normally holding said feed plate in stationary position, means for at intervals allowing said feed plate to be actuated, and devices for returning said feed plate to normal position.

44. In a machine of the character described, the combination with means for transforming a strip of metal into connected similar links, said means including a main frame and a stationary die and a movable die mounted therein, of mechanism for interspersing special links with said similar links, said mechanism including a special link receiving member associated with said dies, a reciprocatable feed plate upon said receiving member, a rock shaft mounted upon the main frame, a lever fixed to the rock shaft, connections between said lever and feed plate, a spring tending to rotate said rock shaft to actuate said feed plate, devices for normally holding said feed plate in stationary position, means for at intervals allowing said spring to actuate said feed plate, and means for returning said feed plate to normal position.

45. In a machine of the character described, the combination with means for forming a series of connected chain links, said means including a main frame and a stationary die and a movable die mounted therein, of mechanism for interspersing special links in the strand of chain, said mechanism including a special link receiving member associated with said dies, a reciprocatable feed plate associated with said receiving member, a rock shaft mounted upon the main frame, a lever fixed to the rock shaft, connections between said lever and feed plate, means tending to rotate said rock shaft to actuate said feed plate, devices, including a ratchet rotatably mounted upon the main frame, and an L-shaped member fixed upon the rock shaft and having its free arm normally pressing against one face of the ratchet, for normally holding said feed plate in stationary position, means comprising a hole in said ratchet adapted to at intervals aline with the free arm of said L-shaped member for allowing said feed plate to be actuated, there being a pawl movable with the movable die adapted to rotate said ratchet one step upon each ascent of the movable die, and devices, consisting of a block movable with the movable die and having a cam face, and a roller upon the lever fixed to the rock shaft adapted to ride upon said cam face during that descent of the movable die immediately succeeding the actuation of the feed plate, for returning said feed plate to normal position.

46. In a machine of the character described, the combination of means for progressively transforming material into connected chain links, means for feeding such material into position for transformation, means for stopping periodically the feed of such material to provide a space between portions thereof, and means for feeding into such formed space a partly formed chain link whereupon the said interspersed link is incorporated in the chain by said transforming means.

47. In a machine of the character described, the combination of means for transforming into connected chain links material from one source of supply, means for feeding said material to said transforming means, step by step and at predetermined intervals interrupting such feed for one step without stopping the feed of the connected links, separate means for feeding partly formed links from another source of material supply to said transforming means, and means correlated to affect the feed of the last mentioned feeding means when the feed of said first mentioned feeding means is interrupted, whereby the resulting chain is formed from materials from said plurality of sources of supply.

48. In a machine of the character described, the combination of a plurality of sources of chain material supply, means for transforming the materials into chain consisting of links, each having side bars, a relatively small end bar and a relatively large end bar or hook, means for step by step feeding one of said materials to said transforming means, means for feeding periodically the other material to said transforming means, and means for interrupting the step by step feeding means while said other feeding means operates.

49. In a machine of the character described, the combination of means for transforming material into chain, means for feeding chain material between and relative to the elements of said transforming means, means for causing relative movement between portions of the material as it is being transformed into chain to form a space between said portions, and means for feeding into said space special chain material, whereby the latter material is incorporated in the chain by said transforming means.

50. In a machine of the character described, the combination of a pair of relatively movable dies, mechanism for actuating the same, sources of chain material supply, means controlled by said die actuating mechanism to separately feed the chain materials to and between said dies, and means for interrupting the feed of one of said materials while the other feeding means operates.

51. In a machine of the character described, the combination of means for transforming into connected chain links material from one source of supply, means for feeding said material to said transforming means at predetermined intervals, means for interrupting the feed of a portion of such material being transformed, separated means for feeding material partially formed to said transforming means from another source of supply between the portions of the material in the transforming means so as to effect therein the formation of chain from material from said plurality of sources of supply.

52. In a machine of the character described, the combination of a source of chain material supply, a source of special chain link supply, means for transforming said material into chain and incorporating said links therein, and means for separately feeding said material and said links to said transforming means, whereby chain is formed incorporating said special links.

53. In a machine of the character described, the combination of a source of chain material supply, a source of special chain link supply, means for transforming said material into chain and incorporating said special links therein, and separate feeding means for feeding said material and said special links in said machine.

54. In a machine of the character described, the combination of a source of chain material supply, a source of special chain link supply, means for transforming said material into chain and incorporating said special links therein, and separate feeding means for feeding said material and said special links to said transforming and incorporating means.

55. In a machine of the character described, a plurality of bending and transforming elements adapted to the purpose of forming chain progressively, means for feeding material to and between said elements, means for causing relative movement between portions of the material being transformed to form a space therebetween, and means for feeding to such space other material for incorporation by the action of said elements with and between said portions.

In testimony whereof I affix my signature.

CHARLES PARKER.